US009611979B2

(12) United States Patent
Blair

(10) Patent No.: US 9,611,979 B2
(45) Date of Patent: Apr. 4, 2017

(54) ELECTRONIC TABLET MOUNT

(71) Applicant: Keith Blair, White Plains, NY (US)

(72) Inventor: Keith Blair, White Plains, NY (US)

(73) Assignee: Keith Blair, White Plains, NY (US)

( * ) Notice: Subject to any disclaimer, the term of this patent is extended or adjusted under 35 U.S.C. 154(b) by 0 days.

(21) Appl. No.: 14/885,403

(22) Filed: Oct. 16, 2015

(65) Prior Publication Data

US 2016/0109060 A1 Apr. 21, 2016

Related U.S. Application Data

(62) Division of application No. 14/518,408, filed on Oct. 20, 2014, now Pat. No. 9,282,841.

(51) Int. Cl.
*F16M 13/02* (2006.01)
*A47G 29/00* (2006.01)
*G06F 1/16* (2006.01)
*A47B 55/00* (2006.01)
*A47G 35/00* (2006.01)

(52) U.S. Cl.
CPC ........... *F16M 13/022* (2013.01); *A47B 55/00* (2013.01); *A47G 29/00* (2013.01); *A47G 35/00* (2013.01); *G06F 1/1626* (2013.01)

(58) Field of Classification Search
CPC .. A47B 23/02; A47B 2097/006; A47G 29/00; A47F 5/08
See application file for complete search history.

(56) References Cited

U.S. PATENT DOCUMENTS

| 3,485,544 | A | * | 12/1969 | Beckerman | A47B 46/005 312/245 |
| 4,033,652 | A | * | 7/1977 | O'Brien | A47B 23/02 248/447.1 |
| 4,184,725 | A | * | 1/1980 | Spangler | A47B 88/06 248/447 |
| 4,269,381 | A | * | 5/1981 | Harms | A47B 23/02 211/181.1 |
| 4,369,948 | A | * | 1/1983 | Krauss | A47B 77/10 108/32 |
| 4,460,145 | A | * | 7/1984 | Ando | A47B 46/00 108/140 |
| 4,974,803 | A | * | 12/1990 | Richer | A47G 29/00 248/214 |
| 4,982,848 | A | * | 1/1991 | Church | A47F 5/08 211/128.1 |

(Continued)

OTHER PUBLICATIONS

Non-Final Office Action in corresponding U.S. Appl. No. 14/518,408, mailed Jul. 14, 2015.

*Primary Examiner* — Gary Hoge
(74) *Attorney, Agent, or Firm* — Leason Ellis LLP.

(57) ABSTRACT

A tablet support mount has a main body portion, which when installed is inclined. The upper surface of the inclined main body is adapted for contacting and supporting the tablet. A lower lip is positioned at an angle at the lower end of the main body so as to form an upwardly open V shape. This lip keeps the tablet from sliding off the mount. An upper attachment edge is positioned at an angle at the upper end of the main body. This upper attachment edge is releasably and directly secured to a lower portion of the frame of a cabinet. The main body, lower lip and at least a portion of the attachment edge form a unitary, one piece rigid structure.

6 Claims, 4 Drawing Sheets

(56) References Cited

U.S. PATENT DOCUMENTS

| | | | |
|---|---|---|---|
| D316,727 S * | 5/1991 | Greenspahn | D19/113 |
| 7,100,882 B2 * | 9/2006 | Behroozi | A47B 23/04 248/317 |
| 7,124,988 B1 * | 10/2006 | Duffy | A47B 21/0314 108/40 |
| 2002/0084398 A1 * | 7/2002 | Hensel | A47J 47/16 248/441.1 |
| 2002/0109444 A1 * | 8/2002 | Webb | A47B 96/025 312/313 |
| 2002/0175259 A1 * | 11/2002 | Cress | A47B 23/02 248/447.1 |
| 2003/0168571 A1 * | 9/2003 | Malejko | A47B 23/04 248/447.1 |
| 2006/0249999 A1 * | 11/2006 | Bergin | A47C 7/70 297/188.18 |
| 2011/0267773 A1 * | 11/2011 | Macfarlane | G06F 1/1632 361/679.55 |
| 2012/0168579 A1 * | 7/2012 | Heersink | A47F 5/0853 248/205.4 |
| 2013/0063382 A1 | 3/2013 | Feldstein et al. | |
| 2013/0092811 A1 | 4/2013 | Funk et al. | |
| 2014/0001219 A1 | 1/2014 | Miller | |

* cited by examiner

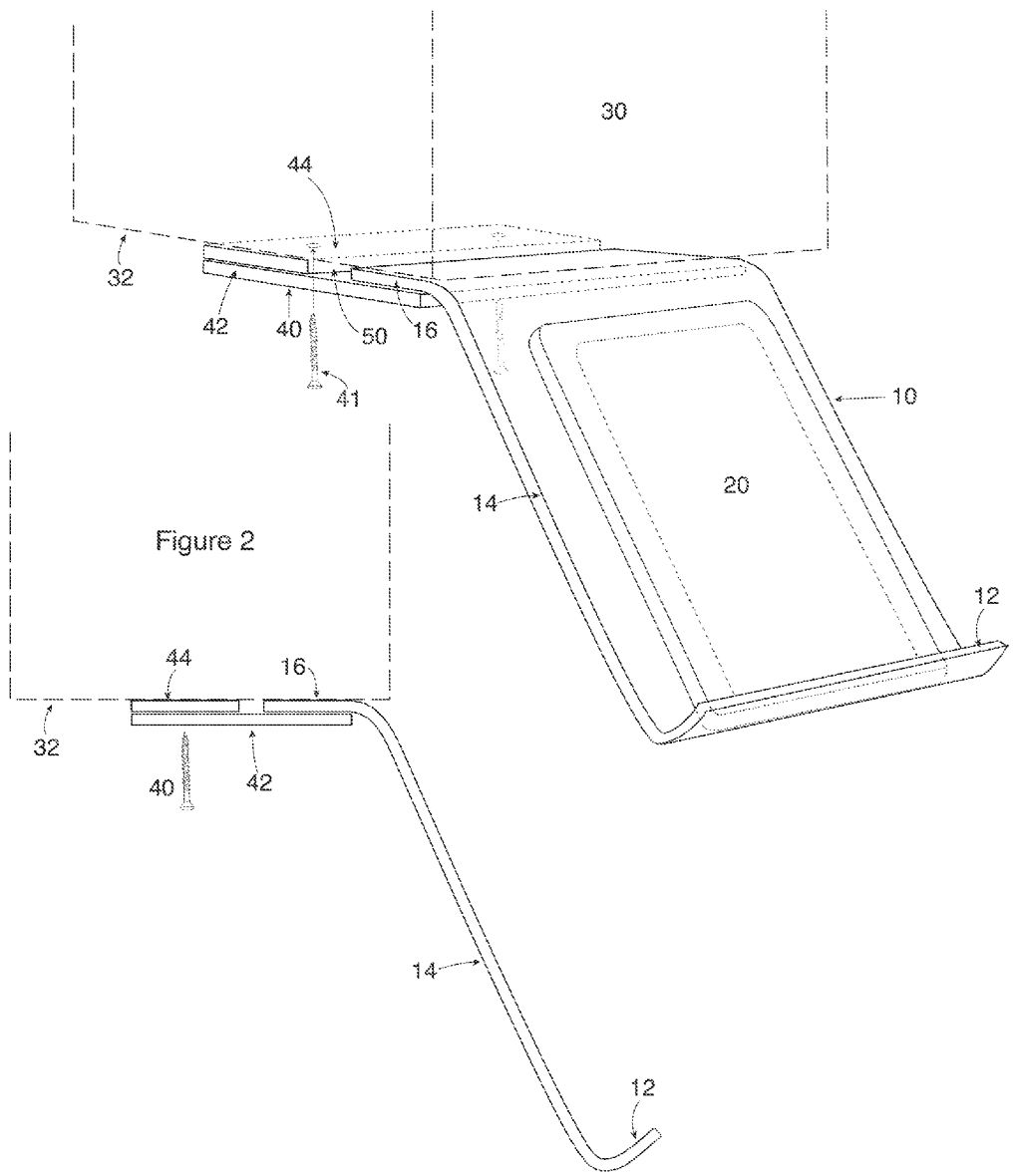

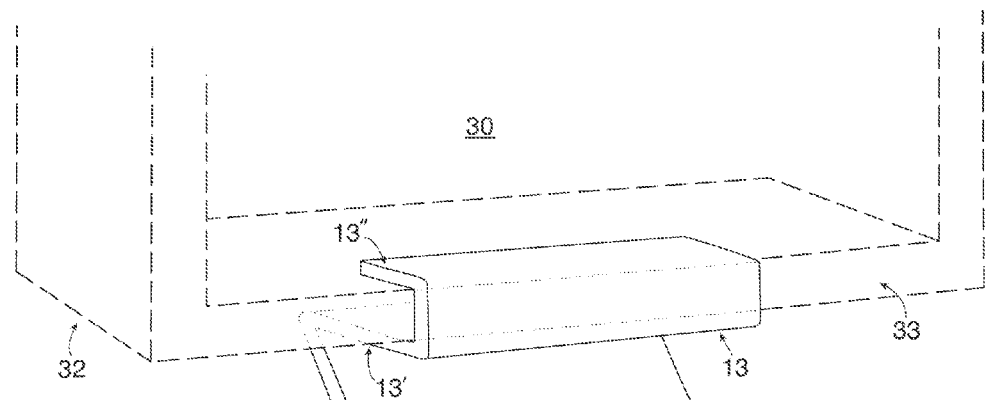
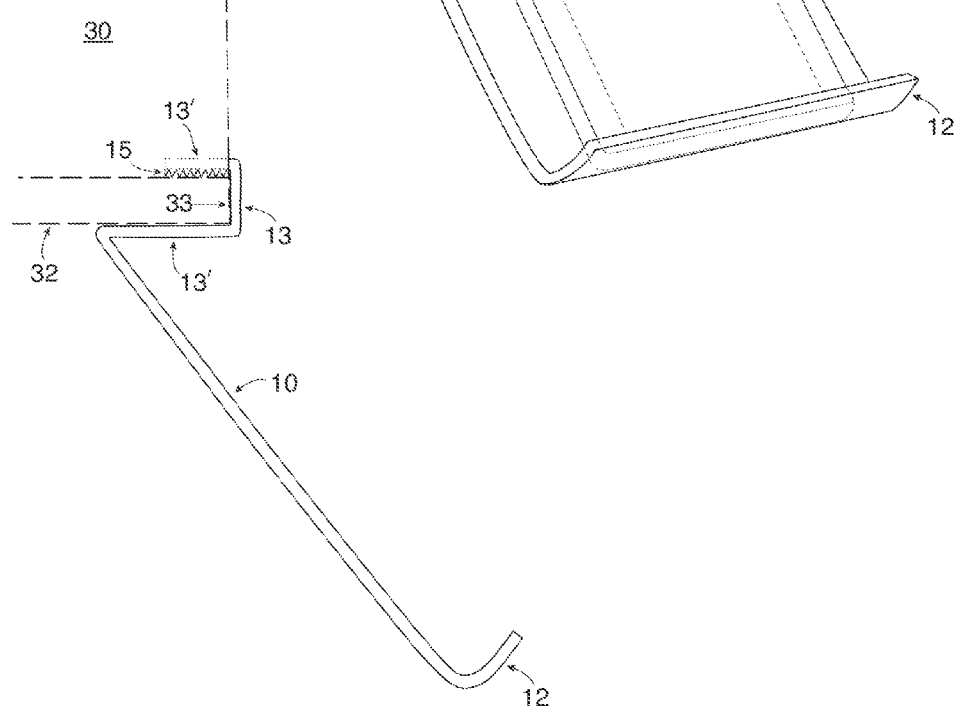

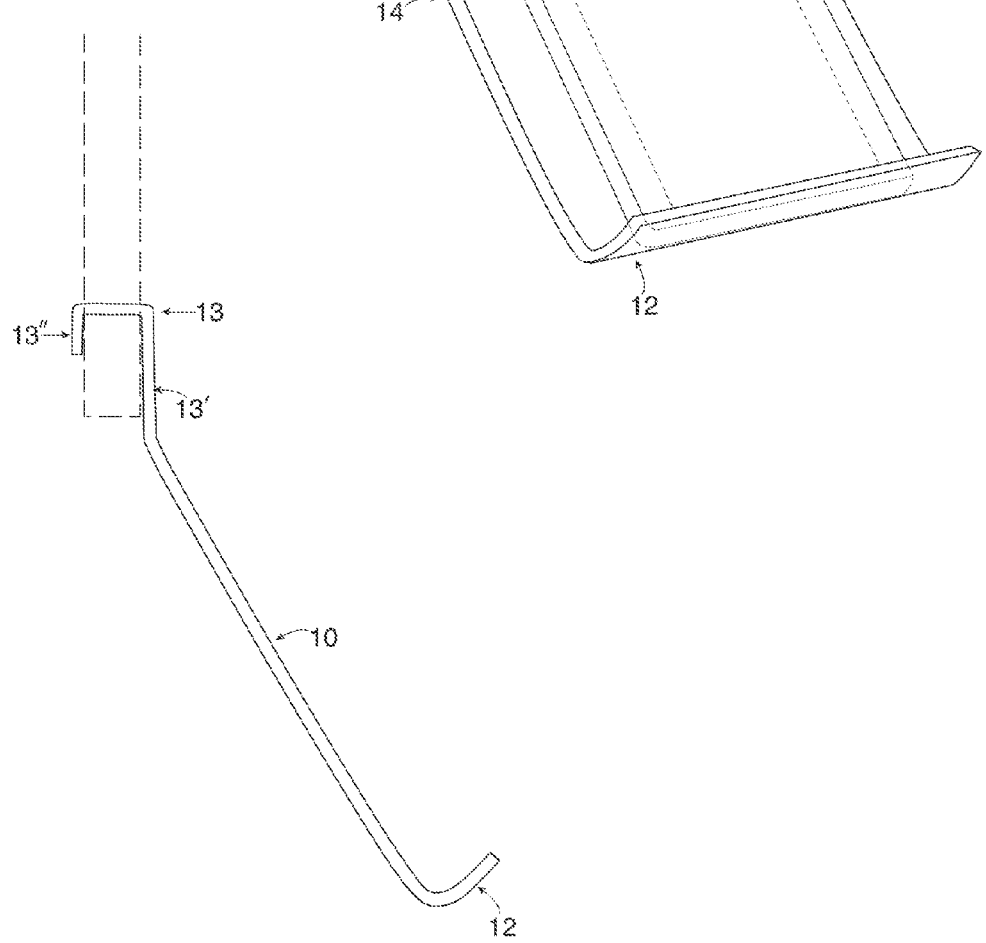

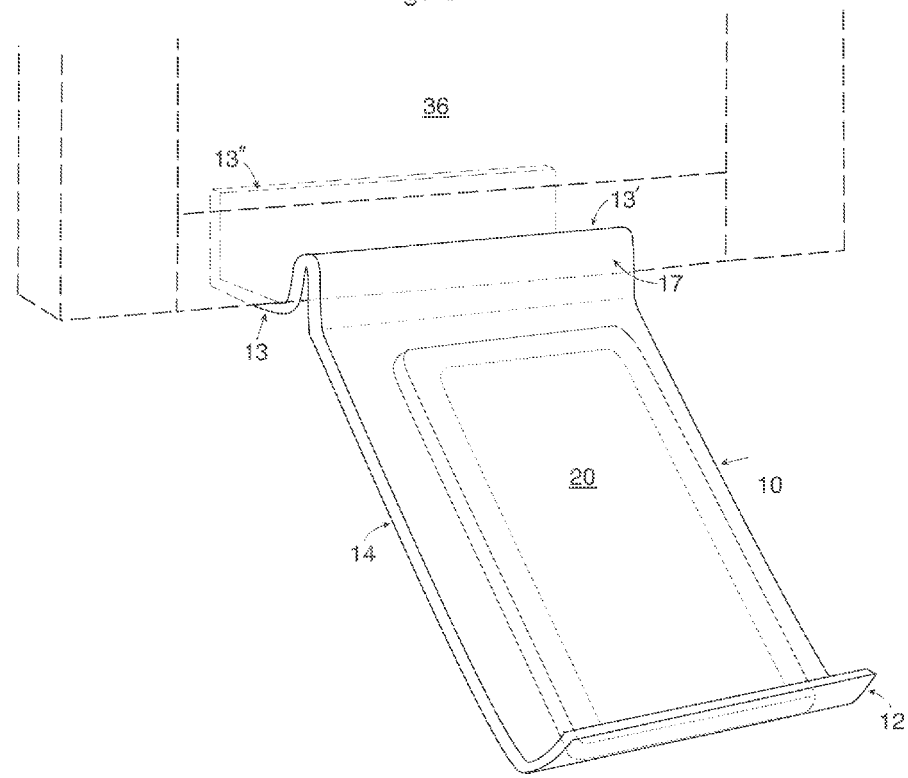
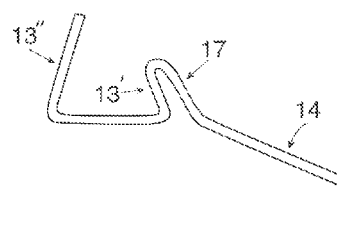
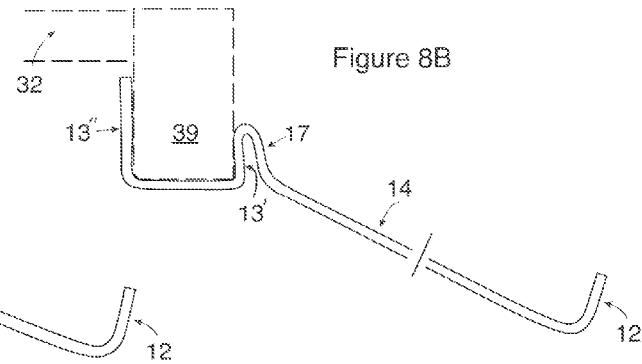

ELECTRONIC TABLET MOUNT

CROSS REFERENCE TO PRIOR APPLICATIONS

This application is a Divisional of U.S. patent application Ser. No. 14/518,408, filed Oct. 20, 2014, which is incorporated by reference in its entirety.

FIELD OF THE INVENTION

The subject matter disclosed herein relates to mounting structures for electronic tablet products.

BACKGROUND OF THE INVENTION

Electronic tablets, such as the Apple IPad® and the Samsung Galaxy Tab® have become very popular in recent years. These devices have a wide variety of computation, display and communications capability. Typically during use they are held in one hand of the user while the user's other hand is employed to operate the device.

However, in certain situations it is more convenient to put the device down so the user has both hands free. For example if the tablet is displaying a food recipe while the user is cooking, it would be very inconvenient to try to hold the tablet while mixing ingredients according to the recipe. As a result, some tablet devices have stands to prop up the device so its screen can be viewed. In such a case the tablet is propped up on a table or kitchen counter. However, if the user is standing and moving about the kitchen, it may be hard to see the screen. Thus, there is a need for a device that would hold the tablet closer to the face of the user while the user is standing.

US Published Patent Application No. 2012/0168579 of Heersink discloses an L-shaped panel that fits below kitchen cabinets to support an electronic device, such as a tablet. It has slots in its vertical flange. A holder for an accessory has tabs that fit in the slots. Similarly, US Published Patent Application No. 2013/0063382 of Feldstein et al. discloses a support for a portable touch screen device with a complicated under-cabinet mounting bracket that allows a mounting plate to be fixed at different angles.

A tablet mounting system that includes a detachable tablet stand and a tablet mount is shown in US Published Patent Application No. 2013/0092811 of Funk et al. The tablet stand is configured to releasably connect to a tablet and to rest on a horizontal surface such that a plane defined by the tablet stand forms an angle with the horizontal surface. A Published Patent Application of Wetzel (US2013/0092811) has a cylindrical piece that is mounted to the underside of a cabinet, e.g., with a screw. An angular bracket is fastened to the cylinder with a screw and to the front edge of the cabinet. The end of the bracket can be coupled to the back of a tablet computer. Again, the cabinet connection is much more complicated than your design. Also, US Published Patent Application No. US2014/0001219 of Miller discloses a tablet style PC hanging mounts with a strap having a loop to wrap around a convenient structure. The strap has legs at its end that are separated. The legs each have hook portions that can engage and support a tablet-style PC computer, such as an IPad or other tablet device.

The company Belkin makes a kitchen cabinet mount for a tablet, which has two parts that act as a clamp to support the mount from the bottom shelf of a cabinet. It is flexible in that it can be moved from cabinet to cabinet without having to make new screw connections to the cabinets. A similar product is made by Upper Desk. This product has a clamp for engaging the bottom shelf of a cabinet. The clamp supports a mount for an IPad. As a result, the support, while more complicated than some, is easily moved.

The Original Kitchen IPad Rack has an L-shaped panel that fits below kitchen cabinets. The panel has slots in its vertical flange. A holder for an accessory has tabs that fit in the slots. This product seems to be like the one disclosed in US Published Patent Application No. 2012/0168579 of Heersink. The Universal Tablet Computer Under-Cabinet Mount is like the Wetzel publication with a cylinder extending from the bottom of a cabinet and an angular bracket connected to it. The Tablet Recipe Book Holder has a book mount that is attached to the underside of a cabinet by a hinge system attached to the cabinet.

While the known prior art includes numerous supports for electronic tablets that can support the tablet so it is closer to the face of the user than when it is resting on a desk or counter, e.g., by suspending it from the underside of a kitchen cabinet, they are typically difficult to install and or to move to a new location. Thus, it would be advantageous if a tablet support were provided that was easy to install and to move to a new location.

SUMMARY OF THE INVENTION

The present invention is a tablet support that can be quickly and easily installed under a kitchen cabinet and moved to a second predefined location.

According to an exemplary embodiment of the invention, the tablet support includes an acrylic mount that has a curved Z-shaped body with a lower lip that supports the tablet, e.g., an IPad. When installed a main body section 1 of the mount has a backward tilt. There is an upper edge which is horizontal that is used to attach the mount below a cabinet, e.g., a kitchen cabinet.

An attachment plate, which may also be made of acrylic material, has a stepped shape with a longer lower part and a shorter upper part. The upper part mounts, e.g., by screws, to the underside of the kitchen cabinet. As a result a gap is created between the lower part and the bottom of the cabinet. Because the upper part is made slightly thicker than the upper edge of the mount, the upper edge can be easily slid into the gap. Because of the length of the gap, which is determined by the difference in the size of the upper and lower parts of the attachment plate, the mount can be securely attached to the cabinet without the need for any further attachments means. Thus, it can also be easily slid out of the gap.

In effect, the weight of the mount, even without the IPad, is sufficient to cause the Z shape to pivot slightly about the end of the lower plate causing the upper edge of the mount to engage the bottom of the cabinet. This design is useful, for example, for holding the IPad under a kitchen cabinet and above a kitchen counter so that users can read recipes on it while keeping their hands free. It would be convenient if several attachment plates were located about the kitchen at various locations so the mount can be easily moved to new locations as needed.

As an alternative, the body can be provided with an inverted U-shaped channel at its upper end. This channel can be made to fit over the lower edge of a kitchen cabinet frame when it has an upstanding section at the door opening. When the kitchen cabinet frame has no upstanding frame and the lower shelf is flush with the door opening, the U-shaped channel can be made horizontal so as to engage the lower shelf directly. When the cabinet has either an upstanding frame or no frame, the body can be attached

BRIEF DESCRIPTION OF THE DRAWINGS

The foregoing and other objects and advantages of the present invention will become more apparent when considered in connection with the following detailed description and appended drawings in which like designations denote like elements in the various views, and wherein:

FIG. 1 shows a perspective view of the tablet support of the present invention mounted below a kitchen cabinet by a retaining plate defining a gap with the underside of the cabinet:

FIG. 2 is a left side elevation view of the support of FIG. 1;

FIG. 3 is a perspective view of another embodiment of the tablet support with a 90 degree rotated U-shaped channel at one end engaging a flush bottom of a kitchen cabinet frame;

FIG. 4 is a left side elevation view of the embodiment of the tablet support FIG. 3:

FIG. 5 is a perspective view of a still further embodiment of the tablet support with an inverted U-shaped channel at one end hooked over a lower vertical edge of a kitchen cabinet frame;

FIG. 6 is a left side elevation view of the further embodiment of FIG. 5;

FIG. 7 is a perspective view of an even further embodiment of the tablet support with an inverted U-shaped clamp at one end, which clamp is designed to grasp the lower vertical edge of a kitchen cabinet frame; and FIG. 8A is a left side elevation view of the embodiment of FIG. 7 prior grasping the cabinet frame and FIG. 8B is a left side elevation view of the embodiment of FIG. 7 grasping the cabinet frame.

DETAILED DESCRIPTION OF EXEMPLARY EMBODIMENTS OF THE INVENTION

An electronic tablet, e.g., an IPad 20, is shown supported by a mount 10 in the perspective view of FIG. 1. The body of the mount has a curved Z-shape with a lower lip 12 which keeps the IPad from sliding off the body when the body is installed and the IPad is placed on the upper surface of the main body section 14. When installed as shown in FIG. 1 the main body section 14 has a backward tilt as best seen in FIG. 2, which also helps to keep the IPad in place and angled for easy viewing. There is also an upper edge 16 which is horizontal when the mount is installed. This edge 16 is used to attach the mount below a cabinet, e.g., a kitchen cabinet 30, shown in dotted line.

The mount 10 may be made in any desired color of any convenient material, e.g., aluminum. However, clear acrylic is preferred because it is reasonably light weight. Also, it is transparent and therefore gives the structure a light appearance and seems to support the IPad in space without any visible structure.

An attachment plate 40, which may also be made of acrylic material, has a stepped shape with a longer lower part 42 and a shorter upper part 44. The upper plate mounts, e.g., by screws 41, to the underside of the cabinet 30 in alignment with, but below the door of the cabinet (not shown for the sake of clarity). As a result a gap 50 is created between the lower part 42 and the bottom 32 of the cabinet. Because the upper part 44 is made slightly thicker than the upper edge 16 of the mount, the upper edge can be easily slid into the gap 50. Because of the length of the gap, which is determined by the difference in the size of the upper and lower parts of the attachment plate 40, the mount 10 can be securely attached to the cabinet without the need for any further attachments means. Thus, it can also be easily slid out of the gap. In effect, the weight of the mount, even without the IPad, is sufficient to cause the Z shape to pivot slightly about the end of the lower plate 42 causing the upper edge 16 of the mount to engage the bottom 32 of the cabinet.

The present invention is useful, for example, for holding the IPad under a kitchen cabinet and above a kitchen counter so that users can read recipes on the IPad while keeping their hands free. It would be convenient if several attachment plates 40 were located about the kitchen at various locations so the mount 10 can be easily moved to new locations as needed.

In addition to use in the kitchen, the mount of the present invention can also be useful in other rooms of the home or office. For example an attachment plate can be mounted on the underside of an office cabinet or a portion of a desk.

Cabinets, particularly kitchen cabinets, have various different frames. The cabinet 30 in FIG. 1 assumes that the underside of bottom wall 32 is flush and aligned with the bottom of the door. If this is not the case, it may be necessary to include an additional mounting plate. For example, if the bottom is recessed, so that the frame that engages the door is below the bottom (see FIG. 8B), an additional mounting plate (not shown) can be fixed to the bottom of the cabinet to make it flush with the bottom of the door. Then the attachment plate 40 can be mounted on it.

In FIGS. 3 and 4 the cabinet 30 is like that in FIGS. 1 and 2, i.e., the bottom is flush. However, instead of fastening the mount 10 in a gap 50 created by attachment plate 40, another attachment mechanism is provided. In particular, the upper edge 16 of the mount is replaced with a U-shaped channel 13. The channel 13 is horizontal, on 90 degrees from vertical, when the mount is installed. Further, the channel 13 is designed to be open toward the back of the mount and in the direction of the bottom of the cabinet at the door opening.

As best seen in FIG. 4, the channel 13 is merely slipped onto the edge 33 of the bottom 32 of the cabinet at the door opening. Naturally the width of the channel needs to be at least as wide as the bottom edge of the cabinet, but can be slightly larger. The weight of the mount, with or without the IPad, will cause the mount to pivot clockwise in FIG. 4 about the edge 33 of the cabinet. As a result, the lower edge of the channel 13 will be force up into the bottom 32 of the cabinet and the upper edge of the channel will be pulled down into the upper surface of the bottom 32 to wedge the mount onto the edge. In order to accommodate different sizes of edges 33, the channel walls can be made flexible and biased inwardly in a similar fashion to the design of FIGS. 8A and 8B, which will be described in more detail below. In such a case the base width of the channel can be made larger than the expected edge 33, and the design can relied on the inwardly biased walls of the channel 13 to compensate.

A further improvement of the gripping ability of the design of the embodiment to FIGS. 3 and 4 is that a pad 15 may be affixed to the inner surface of the channel 13. This pad 15 may be made of a compressible material to accommodate different sizes of edges 33. In addition, it can have a friction surface to resist the mount sliding off the edge 33. Also, it may include a release adhesive for even more security. It should be noted that this pad 15 may be utilized with all of the designs to accommodate different sizes of cabinet structures to reduce the likelihood the mount will slide off its attachment.

The cabinet 36 in FIGS. 5 and 6 is of the type in which top of the bottom surface is not flush all the way to the door. Instead, there is a vertical lip 37 across the door opening. For this type of cabinet, the channel 13 is rotated 90 degrees from its position in FIGS. 3 and 4 so that it is vertical, i.e., it forms an inverted U-shape. In this case the open part of the channel grasps the lip 37 to support the mount. Again, which the width of the channel needs to be at least the same as the width of the lip 37, it can also be greater. The weight of the mount and perhaps the IPad, cause the mount to rotate clockwise in FIG. 6. This means that the side of the channel on the inside of lip 37 will be pulled into the inside of the lip and the part of the channel on the outside of the lip will push against the outside of the lip, caused the mount to grasp the lip.

As seen in FIGS. 3 and 4 as well as FIGS. 5 and 6, the legs of the channel may be of different length. For example the leg 13' fastened to the body 14 may be longer than the leg 13" on the other side of the channel. These lengths can be adjusted as necessary to improve the grasping action when the mount rotates during installation or for the convenience of manufacture.

The cabinet of FIG. 7 is designed so that its interior bottom is flush with the door opening, so there is no lip 37, but the frame extends below that lower surface of the bottom so that its lower surface is recessed. The result is a lip 39 in front of the bottom wall 32 as best shown in FIG. 8B. As mentioned with respect to FIGS. 1 and 2, the problem created by this lip 39 can be overcome by installing an additional mounting plate onto the bottom surface of bottom wall 32. However, FIG. 7 shows an alternative arrangement. In this case a channel 13 is provided at the upper end of the body. However, unlike the inverted U-shape of FIG. 5, this channel has a U-shape that is upwardly open and adapted to engage the lip 39 as best shown in FIG. 8B. The inner leg 13' is connected by a generally vertical plate 17 to the upper edge of the body 14.

The structure in FIGS. 7 and 8B are not particularly effective when weight is applied to the body of the mount 10. In particular, as seen in FIG. 8B, when weight is applied to the mount body 14, it would tend to cause the leg 13' closest to the mount to slide off lip 39. One way to compensate for this it to make leg 13' significantly longer so that it extends further up on lip 39. Another way is to provide channel 13 with a gripping action. As shown in FIG. 8A, channel 13 is made of flexible material that is biased to close the channel. It has to be spread apart against the bias in order to mount it on the lip 39. This spring force of the channel legs tens to hold it more securely on the lip.

While the invention has been particularly shown and described with reference to preferred embodiments thereof, it will be understood by those skilled in the art that various changes in form and details may be made therein without departing from the spirit and scope of the invention. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What I claimed is:

1. A tablet support mount comprising:
 a main body portion, which when installed is inclined, an upper surface of the inclined main body adapted for contacting and supporting the tablet;
 a lower lip positioned at an angle at the lower end of the main body so as to form an upwardly open V shape; and
 an upper attachment edge in the form of a U-shaped channel with first and second legs, and a base, the first leg is attached to the upper end of the main body by a vertical plate so that when installed on a cabinet frame the channel is vertical with its open end directed upward toward a lip at the edge of the bottom of the cabinet frame, wherein the open end of the U-shape is sized to fit over and grasp the lip at the edge of the bottom of the cabinet.

2. The tablet support mount of claim 1 wherein the legs of the U-shaped channel are flexible and are biased toward each other.

3. The tablet support mount of claim 1 further including a pad on the inner surface of at least one of the legs of the U-shaped channel, said pad being compressible.

4. The tablet support mount of claim 3 wherein the pad has a friction surface on the side toward the bottom of the cabinet.

5. The tablet support mount of claim 3 wherein the pad has an adhesive release surface on the side toward the bottom of the cabinet.

6. The tablet support mount of claim 1 wherein the tablet is an electronic tablet.

* * * * *